United States Patent [19]

Veronesi et al.

[11] 4,224,363
[45] Sep. 23, 1980

[54] MOTOR JACKING APPARATUS

[75] Inventors: Luciano Veronesi, O'Hara Township, Allegheny County; Woodie R. Francis, Export, both of Pa.

[73] Assignee: Westinghouse Electric Corp., Pittsburgh, Pa.

[21] Appl. No.: 858,862

[22] Filed: Dec. 8, 1977

[51] Int. Cl.² ............................................. F04B 17/00
[52] U.S. Cl. .................................... 417/360; 417/361
[58] Field of Search ............................... 417/360, 361

[56] References Cited

U.S. PATENT DOCUMENTS

| | | | |
|---|---|---|---|
| 1,934,155 | 11/1933 | Van Deventer | 417/360 |
| 3,199,748 | 8/1965 | Hollis et al. | 417/360 X |
| 3,404,631 | 10/1968 | Nixon | |
| 3,601,498 | 8/1971 | Schroeder | 417/360 |

Primary Examiner—Richard E. Gluck
Attorney, Agent, or Firm—L. A. DePaul; Z. L. Dermer

[57] ABSTRACT

Apparatus for vertically separating a motor drive shaft from a load shaft while maintaining alignment between the motor drive shaft and the load shaft so that the load shaft and associated apparatus may be accessed for repair or replacement.

8 Claims, 7 Drawing Figures

MOTOR JACKING APPARATUS

BACKGROUND OF THE INVENTION

This invention relates to jacking apparatus and more particularly to a pump-motor set having apparatus for separating the motor from the pump.

In a nuclear reactor power plant the nuclear reactor generates heat which is transferred by the reactor coolant to a location remote from the nuclear reactor for the generation of steam and electricity in a conventional manner. In order to circulate the reactor coolant through the system, reactor coolant pumps are located in the reactor coolant circulatory system for pumping the reactor coolant through the system. Typically these reactor coolant pumps comprise a vertical pump with an electric motor vertically mounted on the pump by means of a cylindrical or conical structure known as a motor stand. The electric motor's rotatable drive shaft is connected to the pump's rotatable shaft through a coupling device. In this manner, the rotation of the motor's rotatable drive shaft causes the pump's rotatable shaft to rotate which causes the pump to circulate the reactor coolant through the reactor system in a manner well known to those skilled in the art. One such reactor coolant pump is described in copending application Ser. No. 730,056 filed Oct. 6, 1976 entitled "Vertical Pump With Free Floating Check Valve" by M. Lindsay and assigned to the assignee of the present invention.

Occasionally it is necessary to repair or replace certain parts of the pump such as the pump seals. In the prior art when such repair or replacement was necessary the motor and pump were deactivated and the motor was disconnected from the pump at the coupling interface between the motor's rotatable drive shaft and the pump's rotatable shaft and at the interface between the motor housing and motor stand. Once the motor and pump were disconnected, an overhead crane would then vertically remove the motor thus exposing the top of the pump shaft. At this point, working personnel utilizing common lifting devices such as hoists and cranes would then disassemble and remove the necessary pump parts to enable replacement or repair of the particular part.

There are several problems associated with this prior art procedure for repairing the pump. For example, when it is desired to reconnect the motor to the pump, it is necessary to utilize a very time consuming procedure of realigning the motor drive shaft with the pump shaft to insure proper pump operation. This problem is particularly acute when the pump is utilized in an electric power plant such as a nuclear power plant because the slow process of realigning the motor and pump shafts may result in expensive down time of the power plant and increased maintenance costs. In addition, when the motor is removed from the pump, a large storage area is needed for the motor while the repair is performed. This storage problem is further accentuated in a nuclear reactor power plant because the nuclear reactor and reactor coolant pumps are located in a containment vessel where a provision for storage space can be quite costly. Furthermore, in a nuclear power plant an overhead polar crane is normally utilized to lift and transport the motor. These overhead polar cranes are generally quite slow which results not only in further time delays related to the pump, but also in other time delays since the crane cannot be utilized for other purposes while engaged in the pump repair operation.

One arrangement known in the prior art for eliminating the removal of the motor from the pump consists of building the motor-pump set with a shaft spacer known as a spool located between and attached to the motor drive shaft and pump shaft. When repair of the pump is needed, the motor housing remains attached to the motor stand while the shaft spacer is unbolted from the motor drive shaft and pump shaft. Once unbolted, the shaft spacer can be horizontally removed from between the motor drive shaft and pump shaft thereby providing access to the pump components. In addition, this spool arrangement eliminates the need for realignment of the motor drive shaft with the pump shaft. While the spool arrangement does provide one mechanism for accessing the pump components, there exist situations in which either the spool is not used or additional space is required. Therefore, it is desirable to have an arrangement whereby the motor may be separated from the pump by a satisfactory distance without requiring the use of a crane or without requiring realignment of the motor drive shaft and pump shaft.

SUMMARY OF THE INVENTION

Apparatus for vertically separating a motor drive shaft from a load shaft while maintaining alignment between the motor drive shaft and the load shaft so that the load shaft and associated apparatus may be accessed for repair or replacement. The apparatus comprises a jacking mechanism mounted on the load shaft housing and attached to the motor housing for vertically raising the motor housing from the load shaft housing when the motor drive shaft has been disconnected from the load shaft. The jacking mechanism maintains the motor drive shaft in alignment with the load shaft while separating the shafts a sufficient distance to allow access to the load shaft and surrounding components. When repair of the component is complete, the jacking mechanism lowers the motor housing onto the load shaft housing which brings the motor drive shaft and load shaft into the same contact as that that existed prior to the lifting maneuver. The jacking mechanism may comprise an electric motor connected to self-locking machine screw jacks.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

After a period of operation of a nuclear reactor coolant pump, it is generally necessary to perform routine maintenance on certain parts of the pump such as the shaft seals. Before this maintenance can be performed it is necessary to raise the motor of the coolant pump in order to access the parts in question. The invention described herein provides a mechanism for elevating the motor to provide this access.

Figure 1:
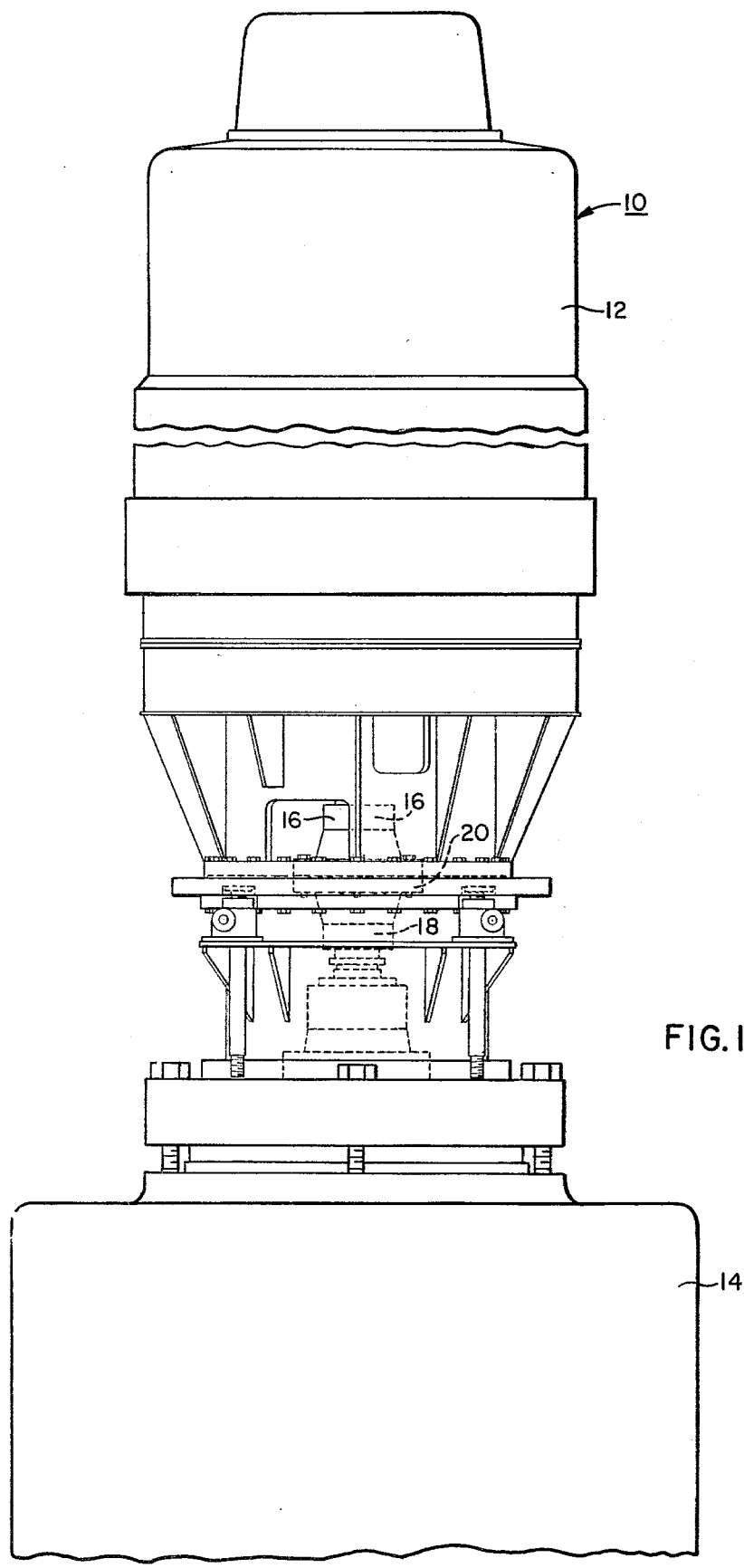
FIG. 1 is a view in elevation of a motor and pump set.

Referring to FIG. 1, a nuclear reactor coolant pump is referred to generally as 10 and comprises an electric motor 12 which rests on a pump 14 in a manner well known to those skilled in the art. In typical operation, reactor coolant pump 10 is arranged vertically with motor 12 located above and on pump 14. One reactor coolant pump of this type is described in copending application Ser. No. 730,056 filed Oct. 6, 1976 entitled "Vertical Pump With Free Floating Check Valve" by M. Lindsay. Motor 12 has a vertical drive shaft 16 which is coupled to pump shaft 18 of pump 14 at coupling 20. When energized, motor 12 causes drive shaft 16 to rotate which causes pump shaft 18 to rotate. The rotation of pump shaft 18 causes the reactor coolant to circulate through the nuclear reactor system in a conventional manner.

Figure 2:
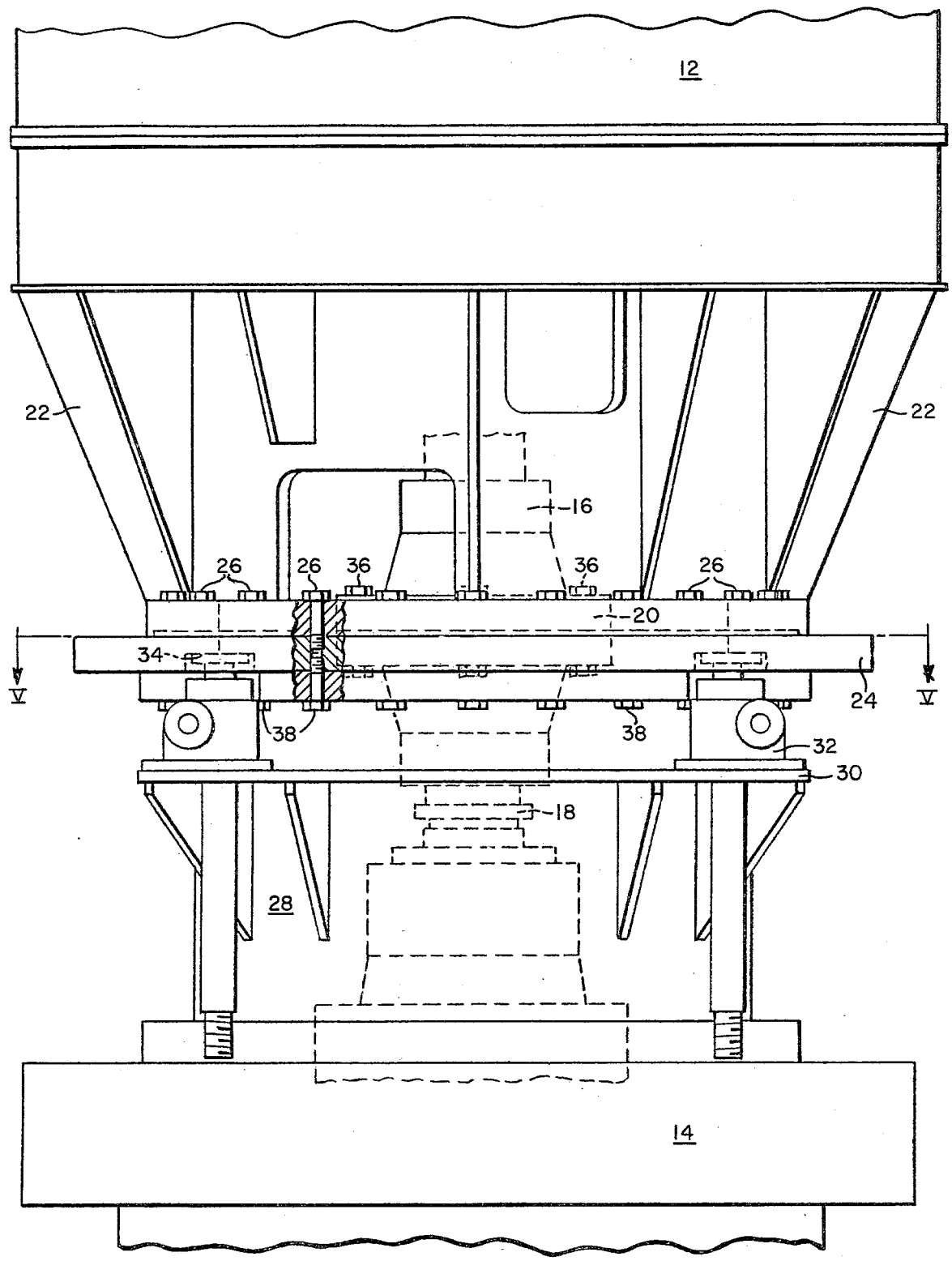
FIG. 2 is a partial cross-sectional view in elevation of the attached motor and pump.

Referring now to FIG. 2, motor 12 has a motor housing 22 which encloses motor 12. A steel support ring 24 is bolted to the bottom or motor housing 22 by first bolts 26. Support ring 24 rests on motor stand 28 which encloses the upper portion of pump 14. Motor stand 28 generally is attached to pump 14 and thereby vertically supports motor housing 22. Motor stand 28 has a ledge 30 attached thereto which extends around the outside of motor stand 28. A jacking mechanism 32 is mounted on ledge 30 and extends upwardly into contact with support ring 24. Jacking mechanism 32 contacts and may be attached to support ring 24 at a location such as location 34. Jacking mechanism 32 is provided such that when energized it is capable of raising support ring 24 upwardly and away from motor stand 28.

Figure 3:
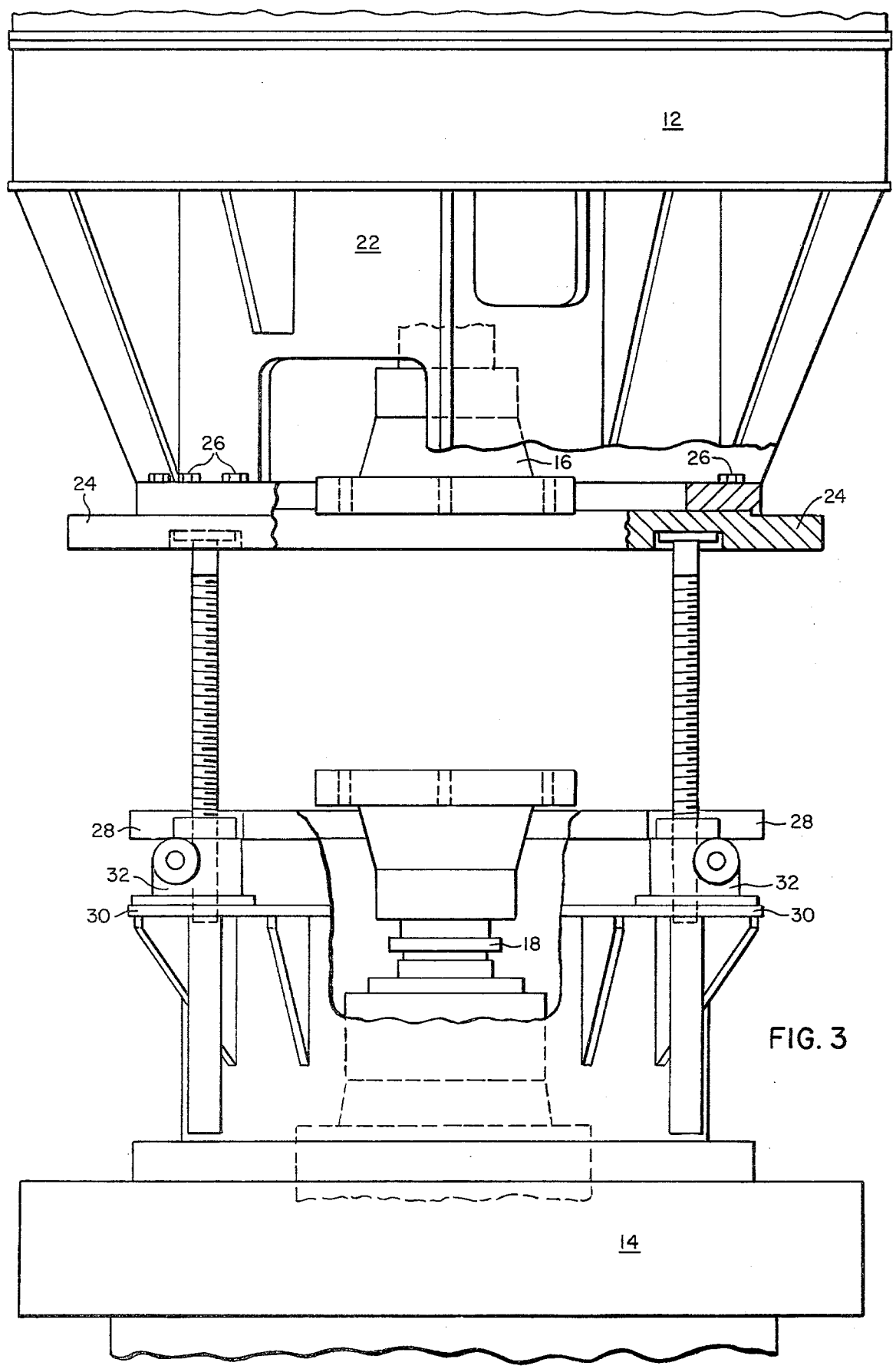
FIG. 3 is a partial cross-sectional view in elevation of the motor and pump with the motor in the raised position.

During normal operation of reactor coolant pump 10, drive shaft 16 is bolted to pump shaft 18 by second bolts 36 that extend through coupling 20. In addition, support ring 24 is bolted to motor stand 28 by third bolts 39 so that motor housing 22 is firmly attached to motor stand 28 during operation of reactor coolant pump 10. However, when it is desired to perform routine maintenance on pump 14 such as removing the shaft seals (not shown), second bolts 36 are removed which disconnects drive shaft 16 from pump shaft 18 and third bolts 38 are removed which disconnects support ring 24 from motor stand 28. At this point motor housing 22 remains attached to support ring 24 which rests on motor stand 28, but support ring 24 is not attached to motor stand 28. Jacking mechanism 32 can then be energized which causes support ring 24 to rise along with motor housing 22. This also causes drive shaft 16 to be separated from pump shaft 18 as shown in FIG. 3. By thus raising motor 12 above pump 14, access may be had to components surrounding pump shaft 18. It should be noted that since jacking mechanism 32 remains attached to ledge 30 of motor stand 28 and to support ring 24, drive shaft 16 remains in proper alignment with pump shaft 18.

Figure 4:
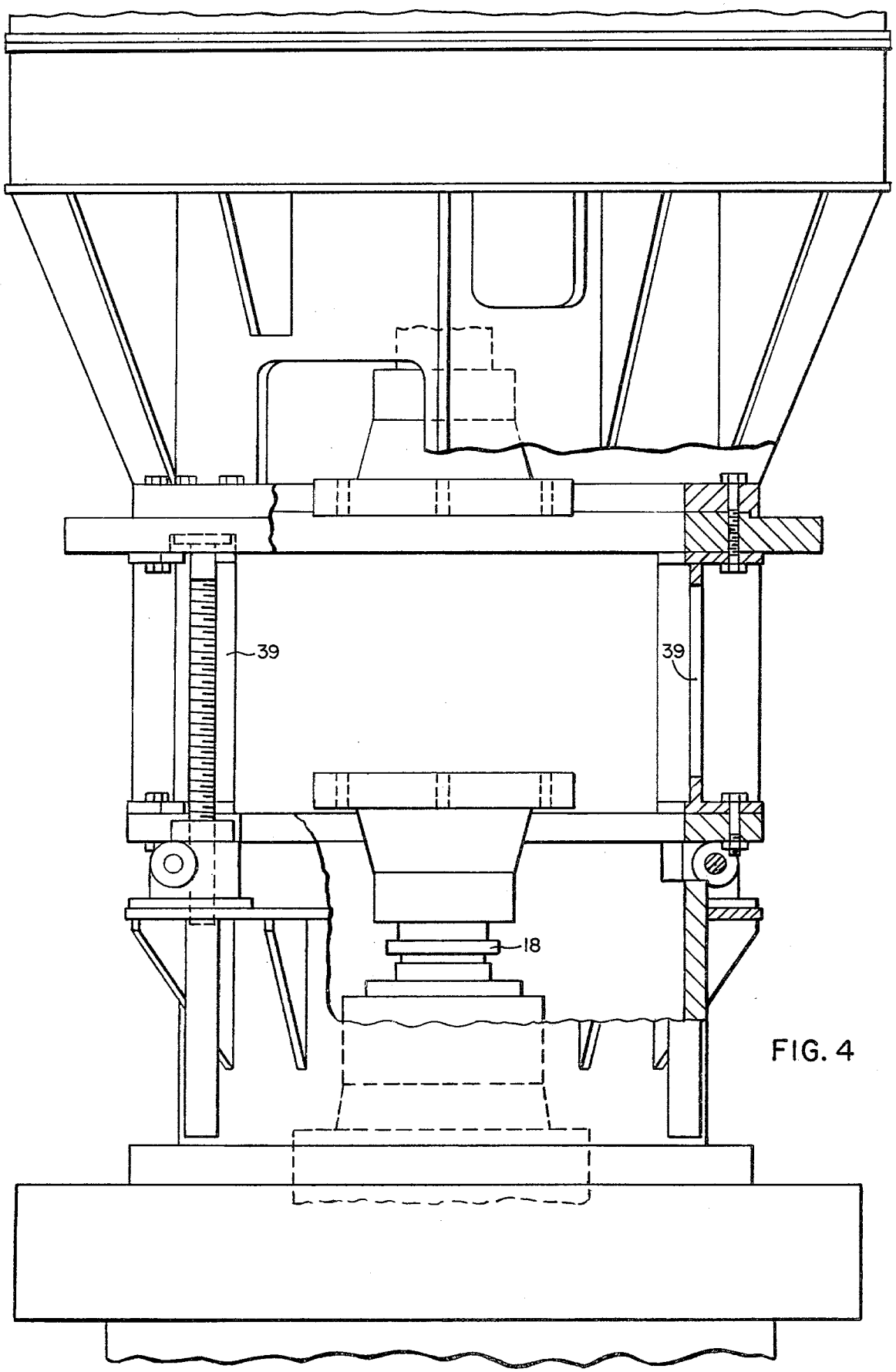
FIG. 4 is a view in elevation of the motor and pump with the motor in the raised position and with the supports inserted.

While jacking mechanism 32 holds motor housing 22 above motor stand 28 as shown in FIG. 3, support skirts 39 may be inserted between motor stand 28 and support ring 24 (as shown in FIG. 4) so as to further support motor housing 22 during the maintenance operation. When the maintenance has been performed on pump 14, support skirts 39 can be removed and jacking mechanism 32 can lower support ring 24 back into contact with motor stand 28 which also brings device shaft 16 into contact and proper alignment with pump shaft 18.

Figure 5:
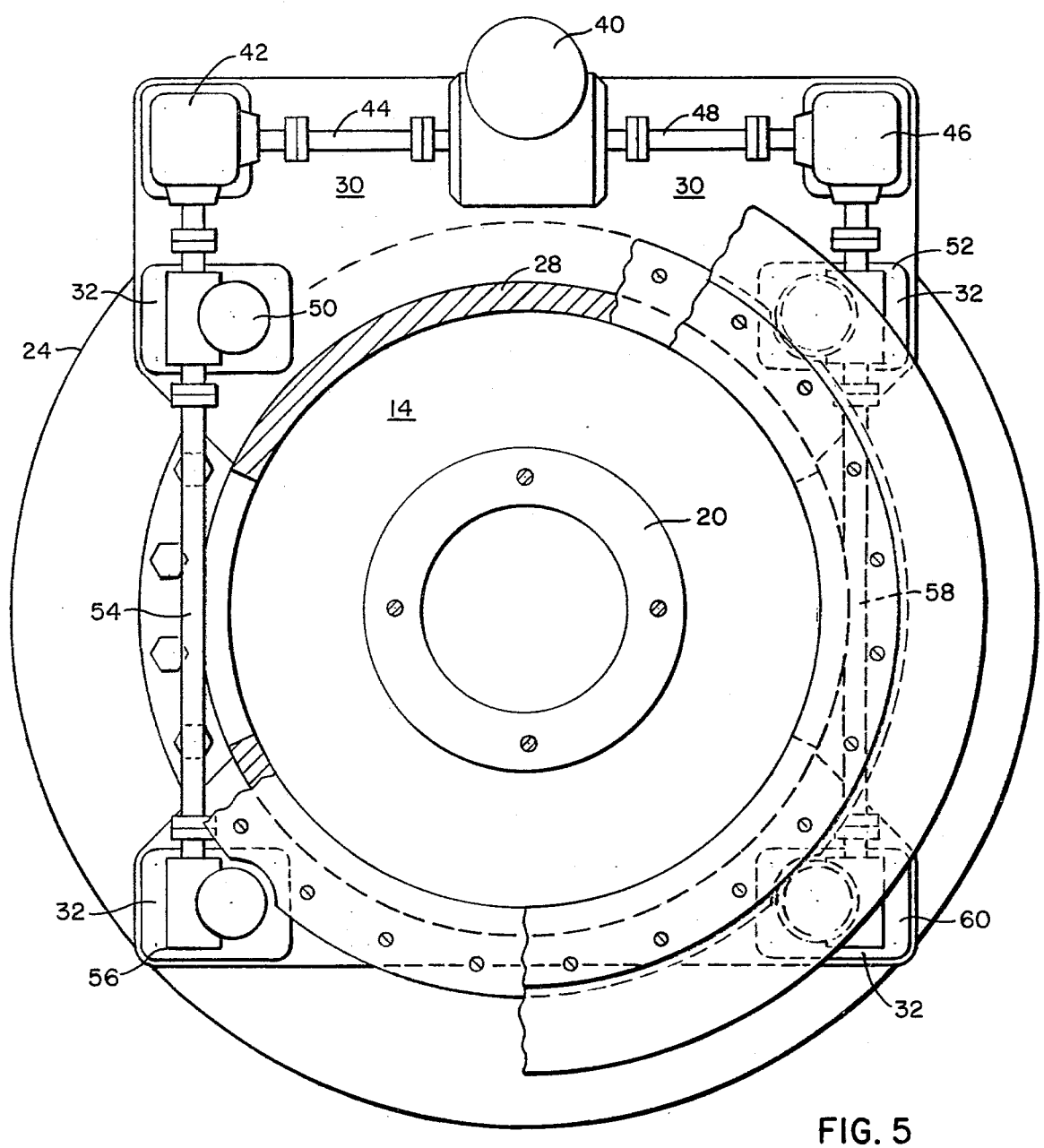
FIG. 5 is a view along line V—V of FIG. 2.

Referring to FIG. 5, while it is possible to utilize only one jacking mechanism 32, it is preferable to use four evenly spaced jacking mechanisms as shown. A gear motor 40 which may be a motor of approximately 5 horsepower is mounted on ledge 30 between two jacking mechanisms 32. Gear motor 40 is connected to a first right angle gear box 42 by first shaft 44 and to a second right angle gear box 46 by second shaft 48. Right angle gear boxes 42 and 46 may be miter gear boxes chosen from among those well known in the art. First right angle gear box 42 is connected to a jacking mechanism 32 such as jacking mechanism 50 while second right angle gear box 46 is connected to a jacking mechanism 32 such as jacking mechanism 52. When energized, gear motor 40 transmits power to jacking mechanism 50 through first shaft 44 and first right angle gear box 42, which causes jacking mechanism 50 to raise support ring 24. Likewise and simultaneously gear motor 40 causes jacking mechanism 52 to also raise support ring 24. In addition, a third shaft 54 is connected between jacking mechanism 50 and jacking mechanism 56 while a fourth shaft 58 is connected between jacking mechanism 52 and jacking mechanism 60. In this manner all jacking mechanisms 32 may be activated simultaneously by the use of one gear motor thus raising support ring 24 and motor housing 22 to an appropriate height above motor stand 28. As an alternative, a second gear motor and two additional right angle gear boxes (not shown) may be similarly connected to jacking mechanisms 56 and 60 so that all four jacking mechanisms 32 may be driven by either or both gear motors. This would provide the capability of raising heavier loads or providing an auxiliary motor should one fail to operate.

Figure 7:
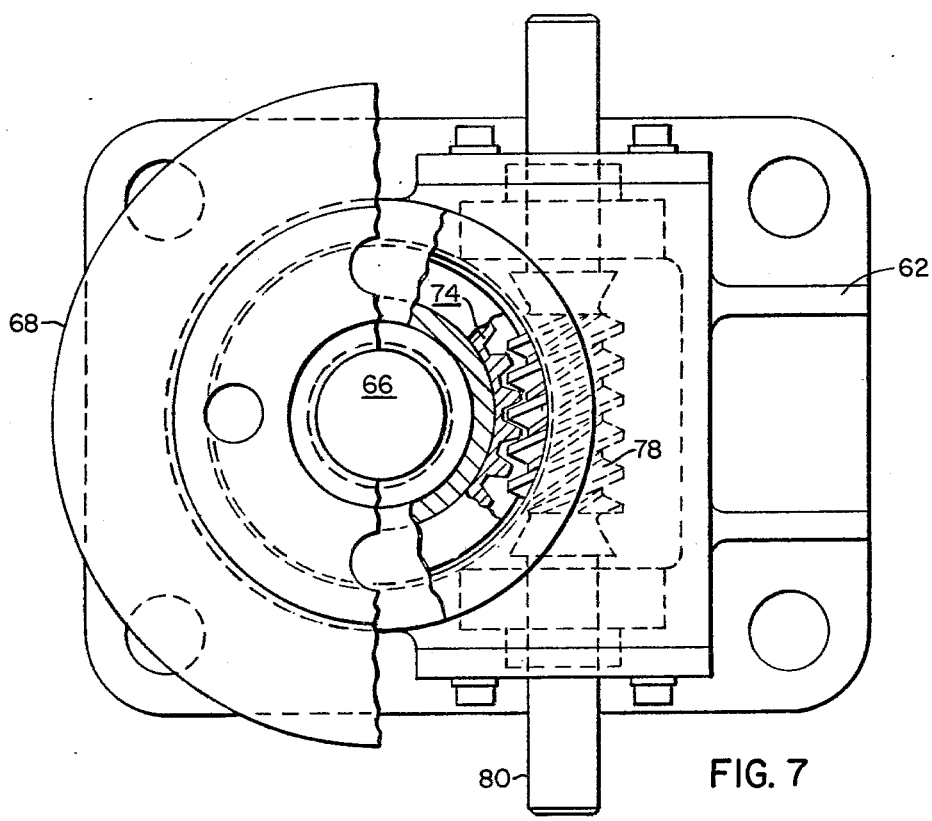
FIG. 7 is a plan view of one jacking mechanism.
Figure 6:
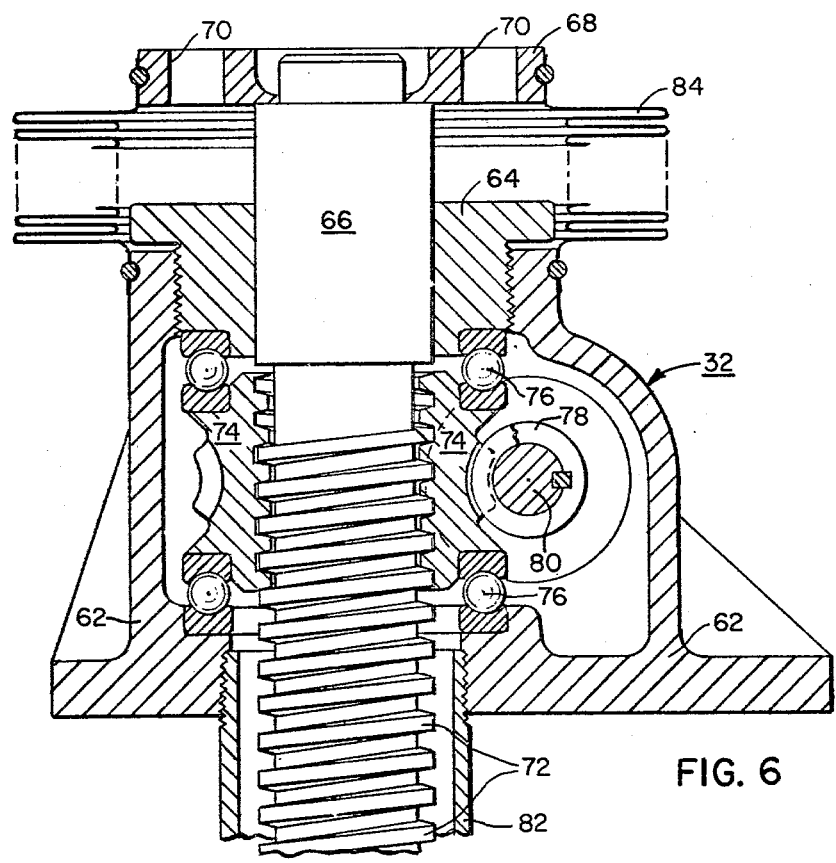
FIG. 6 is a cross-sectional view in elevation of one jacking mechanism.

Referring now to FIGS. 6 and 7 jacking mechanism 32 may comprise a casing 62 with a pearlitic iron shell cap 64 attached thereto. A lifting screw 66 extends through shell cap 64. Lifting screw 66 has a top plate 68 attached to the top thereof that has bolt holes 70 therethrough for accommodating bolts for fastening lifting screw 66 to support ring 24. Lifting screw 66 also has screw threads 72 therein for engagement with gears that cause lifting screw 66 to be extended upwardly thus exerting an upward force on support ring 24. A first gear 74 is supported within casing 62 by bearings 76. First gear 74 extends around lifting screw 66 and into engagement with screw threads 72. A self-locking worm gear 78 is mounted within casing 62 and in engagement with first gear 74. Worm gear 78 is mounted on a rotatable shaft 80 which may be a shaft such as third shaft 54. The rotation of rotatable shaft 80 causes worm gear 78 to rotate which in turn causes first gear 74 to rotate about lifting screw 66 while in engagement with screw threads 72. The rotation of first gear 74 causes lifting screw 66 to be raised which results in raising motor housing 22. Of course, reverse rotation of rotatable shaft 80 would cause lifting screw 66 to be lowered thereby lowering motor housing 22. The use of a self-locking worm gear 78 prevents the weight of motor housing 22, which may be greater than 80,000 pounds, from forcing lifting screw 66 downward when rotatable shaft 80 is not rotating. In addition, a pipe section 82 may enclose the bottom portion of lifting screw 66 while a bellows member 84 may enclose the upper portion thereof.

OPERATION

When it is necessary to access certain parts of pump 14, motor 12 is deactivated and second bolts 36 are removed thus disconnecting drive shaft 16 from pump shaft 18 at coupling 20. Third bolts 38 are also removed which disconnects support ring 24 from motor stand 28. At this point gear motor 40 is energized which causes first shaft 44 and second shaft 48 to rotate which, through right angle gear boxes 42 and 46 causes shafts such as rotatable shaft 80 to rotate. The rotation of rotatable shaft 80 causes worm gear 78 to rotate which causes first gear 74 to also rotate. The rotation of first gear 74 then causes lifting screw 66 to advance vertically. Since top plate 68 is attached to both lifting screw 66 and support ring 24, the advance of lifting screw 66 causes support ring 24 along with motor housing 22 to be lifted vertically. When motor housing 22 has thus been lifted to an appropriate height, gear motor 40 is stopped. Once in this position, motor housing 22 has been raised sufficiently from motor stand 28 such that working personnel may access components of pump 14 by utilizing conventional techniques such as manual manipulation of the components. When the work has been performed, jacking mechanisms 32 cause motor housing 22 to be lowered back into contact with motor stand 28 where the appropriate bolts can be easily replaced and reactor coolant pump 10 again can be activated. Therefore, the invention provides a means by which the motor may be temporarily separated from the pump by a satisfactory distance without requiring the use of a crane and while maintaining alignment of the drive shaft and pump shaft.

We claim as our invention:

1. A vertical pump comprising:
   a pump having a vertical pump shaft and mounted on a stable support for circulating a fluid;
   a motor having a vertical drive shaft and mounted on said pump with said drive shaft being removably connected to said pump shaft;
   a first jacking mechanism mounted on said pump and extending into contact with said motor for selectively exerting upward force on said motor for vertically moving said motor relative to said pump when said pump shaft has been disconnected from said drive shaft thereby providing area for access to components of said pump while maintaining alignment of said pump shaft and said drive shaft; and
   a jacking motor mounted on said pump and connected to said first jacking mechanism for providing power to said first jacking mechanism.

2. The vertical pump according to claim 1 wherein said jacking means further comprises:
   a second jacking mechanism mounted on said pump and connected to said jacking motor for exerting upward force on said motor for vertically moving said motor relative to said pump;
   a first right angle gear box connected between said jacking motor and said first jacking mechanism for transmitting power from said jacking motor to said first jacking mechanism; and
   a second right angle gear box connected between said jacking motor and said second jacking mechanism for transmitting power from said jacking motor to said second jacking mechanism.

3. The vertical pump according to claim 2 wherein said jacking means further comprises:
   a third jacking mechanism mounted on said pump and connected to said first jacking mechanism and a fourth jacking mechanism mounted on said pump and connected to said second jacking mechanism for exerting upward force on said motor for vertically moving said motor relative to said pump.

4. The vertical pump according to claim 3 wherein said jacking mechanisms are self-locking machine screw jacks.

5. A vertical pump comprising:
   a motor stand mounted on a pump having a vertical pump shaft for circulating a fluid;
   a motor housing removably mounted on said motor stand and enclosing a motor having a vertical drive shaft with said drive shaft being removably connected to said pump shaft;
   a support ring attached to said motor housing at the interface between said motor housing and said motor stand and being removably attached to said motor stand for supporting said motor housing;
   a first jacking mechanism mounted on said motor stand and extending into contact with said support ring for selectively exerting upward force on said support ring for vertically moving said motor housing relative to said motor stand when said support ring is not attached to said motor stand thereby providing area for access to components of said pump while maintaining alignment of said pump shaft and said drive shaft; and
   a jacking motor mounted on said motor stand and connected to said first jacking mechanism for providing power to said first jacking mechanism.

6. The vertical pump according to claim 5 wherein said jacking means further comprises:
   a second jacking mechanism mounted on said motor stand and connected to said jacking motor for exerting upward force on said support ring for vertically moving said motor housing relative to said motor stand;
   a first right angle gear box connected between said jacking motor and said first jacking mechanism for transmitting power from said jacking motor to said first jacking mechanism; and
   a second right angle gear box connected between said jacking motor and said second jacking mechanism for transmitting power from said jacking motor to said second jacking mechanism.

7. The vertical pump according to claim 6 wherein said jacking means further comprises:
   a third jacking mechanism mounted on said motor stand and connected to said first jacking mechanism and a fourth jacking mechanism mounted on said motor stand and connected to said second jacking mechanism for exerting upward force on said support ring for vertically moving said motor housing relative to said motor stand.

8. The vertical pump according to claim 7 wherein said jacking mechanisms are self-locking machine screw jacks.

* * * * *